(12) United States Patent
Luo et al.

(10) Patent No.: US 10,795,868 B2
(45) Date of Patent: Oct. 6, 2020

(54) SUMMARIZING STATISTICAL DATA FOR DATABASE SYSTEMS AND/OR ENVIRONMENTS

(71) Applicant: TERADATA US, INC., Dayton, OH (US)

(72) Inventors: Congnan Luo, San Diego, CA (US); Heng Yuan, San Diego, CA (US); Guillian Wang, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 511 days.

(21) Appl. No.: 14/087,278

(22) Filed: Nov. 22, 2013

(65) Prior Publication Data

US 2015/0149508 A1  May 28, 2015

(51) Int. Cl.
*G06F 16/00* (2019.01)
*G06F 16/21* (2019.01)

(52) U.S. Cl.
CPC .................... *G06F 16/21* (2019.01)

(58) Field of Classification Search
CPC .......................... G06F 17/30289; G06F 16/21
See application file for complete search history.

(56) References Cited

U.S. PATENT DOCUMENTS

| | | | |
|---|---|---|---|
| 6,460,045 B1* | 10/2002 | Aboulnaga | G06F 17/30469 |
| 6,714,938 B1* | 3/2004 | Avadhanam | G06F 17/30463 |
| 2002/0198896 A1* | 12/2002 | Chaudhuri | G06F 17/30463 |
| 2012/0254199 A1* | 10/2012 | Kuno | G06F 7/32 |
| | | | 707/752 |
| 2013/0229867 A1* | 9/2013 | Tang | G11C 16/26 |
| | | | 365/185.2 |
| 2014/0282160 A1* | 9/2014 | Zarpas | G06F 17/30991 |
| | | | 715/769 |

* cited by examiner

*Primary Examiner* — Tamara T Kyle
*Assistant Examiner* — Lahcen Ennaji
(74) *Attorney, Agent, or Firm* — Ramin Mahboubian (57) ABSTRACT

Database values and their associated indicators can be arranged in multiple "buckets." Adjacent buckets can be combined into a single bucket successively based one or more criteria associated with the indicators to effectively reduce the number of buckets until a desired number is reached.

17 Claims, 7 Drawing Sheets

Total Squared Error: SqError(H) = 11.12

Bucket 1 [N = 5  AvgFreq = 8.6   SqErr = 5.2]   {(1,7) (2,9) (3,10) (4,9) (5,8) }
Bucket 2 [N = 4  AvgFreq = 3.75  SqErr = 2.75]  {(6,4) (7,5)(8,3) (9,3) }
Bucket 3 [N = 2  AvgFreq = 9     SqErr = 2]     {(10,8) (11,10) }
Bucket 4 [N = 3  AvgFreq = 5.3   SqErr = 0.67]  {(12,6) (13,5) (14,5) }
Bucket 5 [N = 2  AvgFreq = 9.5   SqErr = 0.5]   {(15,9) (16,10) }

FIG. 3B

Total Squared Error: SqError(H) = 70.4

Bucket 1 [N = 3  AvgFreq = 8.67  SqErr = 4.7]   {(1,7) (2,9) (3,10) }
Bucket 2 [N = 4  AvgFreq = 6.5   SqErr = 17]    {(4,9) (5,8) (6,4) (7,5) }
Bucket 3 [N = 4  AvgFreq = 6     SqErr = 38]    {(8,3) (9,3) (10,8) (11,10) }
Bucket 4 [N = 4  AvgFreq = 6.25  SqErr = 10.7]  {(12,6) (13,5) (14,5) (15,9) }
Bucket 5 [N = 1  AvgFreq = 10    SqErr = 0]     {(16,10) }

FIG. 3C

Total Squared Error: SqError(H) = 53.7

Bucket 1 [N = 1  AvgFreq = 1   SqErr = 0]    {(3,10) }
Bucket 2 [N = 1  AvgFreq = 1   SqErr = 0]    {(11,10) }
Bucket 3 [N = 1  AvgFreq = 1   SqErr = 0]    {(16,10) }
Bucket 4 [N = 6  AvgFreq = 7   SqErr = 22]   {(1,7) (2,9) (4,9) (5,8) (6,4) (7,5) }
Bucket 5 [N = 7  AvgFreq = 5.57 SqErr = 31.7] {(8,3) (9,3) (10,8) (12,6) (13,5) (14,5) (15,9) }

SUMMARIZING STATISTICAL DATA FOR DATABASE SYSTEMS AND/OR ENVIRONMENTS

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases provide a very good example of a computing environment or system where the storage of data can be crucial. As such, to provide an example, databases are discussed below in greater detail.

The term database can also refer to a collection of data and/or data structures typically stored in a digital form. Data can be stored in a database for various reasons and to serve various entities or "users." Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations, larger user communities, or device populations. Larger databases can be supported by relatively larger capacities, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

Generally, data (or "Statistics") can be collected and maintained for a database. "Statistics" can be useful for various purposes and for various operational aspects of a database. In particular, "Statistics" regarding a database can be very useful in optimization of the queries of the database, as generally known in the art.

In view of the prevalence of databases in various aspects life today and importance of collection of Statistics in operating various databases, it is apparent that techniques relating to database Statistics databases are very useful.

SUMMARY

Broadly speaking, the invention relates to computing environments and systems. More particularly, the invention relates to summarizing information for databases.

In accordance with one aspect of the invention, database values (e.g., column values of a database table) and one or more indicator values associated with them (e.g., frequencies of occurrences of column values in a database table) can be arranged, for example, in multiple "buckets." Then, the adjacent buckets in the arrangement can be combined into a single bucket successively based on one or more criteria to effectively reduce the total number of buckets until a desired total number of buckets is reached. The one or more criteria that are used for combining the buckets can be associated with the indicator values in order to provide a summary (e.g., histogram) of the database values and their indicator values that can generally relay information about the database values. The one or more criteria can, for example, be associated with the indicator values (e.g., proximity of frequency of occurrences) to provide a summary that effectively combines similar information together and attempts to minimize the error in order to provide an accurate summary. By way of example, adjacent buckets can be combined based on a constraint associated with the differences between their indicative values (e.g., an error value measured based on the differences between the frequencies of occurrences for adjacent buckets).

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

As noted in the background section, techniques relating to database Statistics databases are very useful.

To further elaborate, database systems can use histograms to group table column values into "buckets" according to their frequency distribution as a summary. This summary can then be used to estimate the selectivity of queries in query optimization phase. Equal-width and Equal-depth histograms are known in the art.

Also, a variation of High Biased Histogram (HBH) has been used. In concept, it removes the most frequently occurring values (i.e., high-biased values) by keeping them in dedicated buckets. A fixed number of buckets for histogram, for example, 250, can be assumed. This number may be adjusted over time. Each bucket can, for example, either represent a range of values and their average frequency or can represent two high-biased values and their actual frequencies. For example, if 100 out of 250 buckets are used for high-biased values, we can save 200 high-biased values. Then, the rest of values can be non-high-biased and can be represented, using Equal-depth histogram, in the left 150 buckets.

Generally, HBH can perform well. However, if the data has more values with high frequencies than the high-biased value buckets and there is also variance among the frequencies of non-high-biased values, problems can be encountered. At least from this perspective, it would be very useful to have another kind of histogram that can effectively serve as a complement to HBH.

More recently, V-Optimal histograms (VOH) have been developed as arguably the state-of-art approach for generating histograms for databases. Generally, V-Optimal histograms search the best bucket boundaries for grouping values to minimize the accumulated variance between the actual frequency and the estimated frequency of each value. However, in practice, there are two problems for VOH. One is the computation cost, given that finding the global optimal bucket boundaries is a NP-hard problem. Another problem is that the traditional V-Optimal histograms are typically constructed from data only, so the construction process may not account for the characteristics of the application workload or data access patterns.

Accordingly, there is a need for alternative techniques for summarizing data or statistics of databases.

Hence, it will be appreciated that the described techniques, among other things, can be used to provide a Constrained V-Optimal Histogram (CVOH) as an alternative technique for summarizing data or statistics of databases.

Generally, the CVOH can cost less to implement and can also be tailored based on various criteria, including, for example, the characteristics of the application workload and its data access pattern Generally, database values (e.g., column values of a database table) and one or more indicator values associated with them (e.g., frequencies of occurrences of column values in a database table) can be arranged, for example, in multiple "buckets." Then, the adjacent buckets in the arrangement can be combined into a single bucket successively based on one or more criteria to effectively reduce the total number of buckets until a desired total number of buckets is reached in accordance with one aspect of the invention. The one or more criteria that are used for combining the buckets can be associated with the indicator values in order to provide a summary (e.g., histogram) of the database values and their indicator values that can generally relay information about the database values. The one or more criteria can, for example, be associated with the indicator values (e.g., proximity of frequency of occurrences) to provide a summary that effectively combines similar information together and attempts to minimize the error in order to provide an accurate summary. By way of example, adjacent buckets can be combined based on a constraint associated with the differences between their indicative values (e.g., an error value measured based on the differences between the frequency of occurrences for adjacent buckets).

Embodiments of these aspects of the invention are also discussed below with reference to FIGS. 1-8. However, those skilled in the art will readily appreciate that the detailed description given herein with respect to these figures is for explanatory purposes as the invention extends beyond these limited embodiments.

Figure 1:
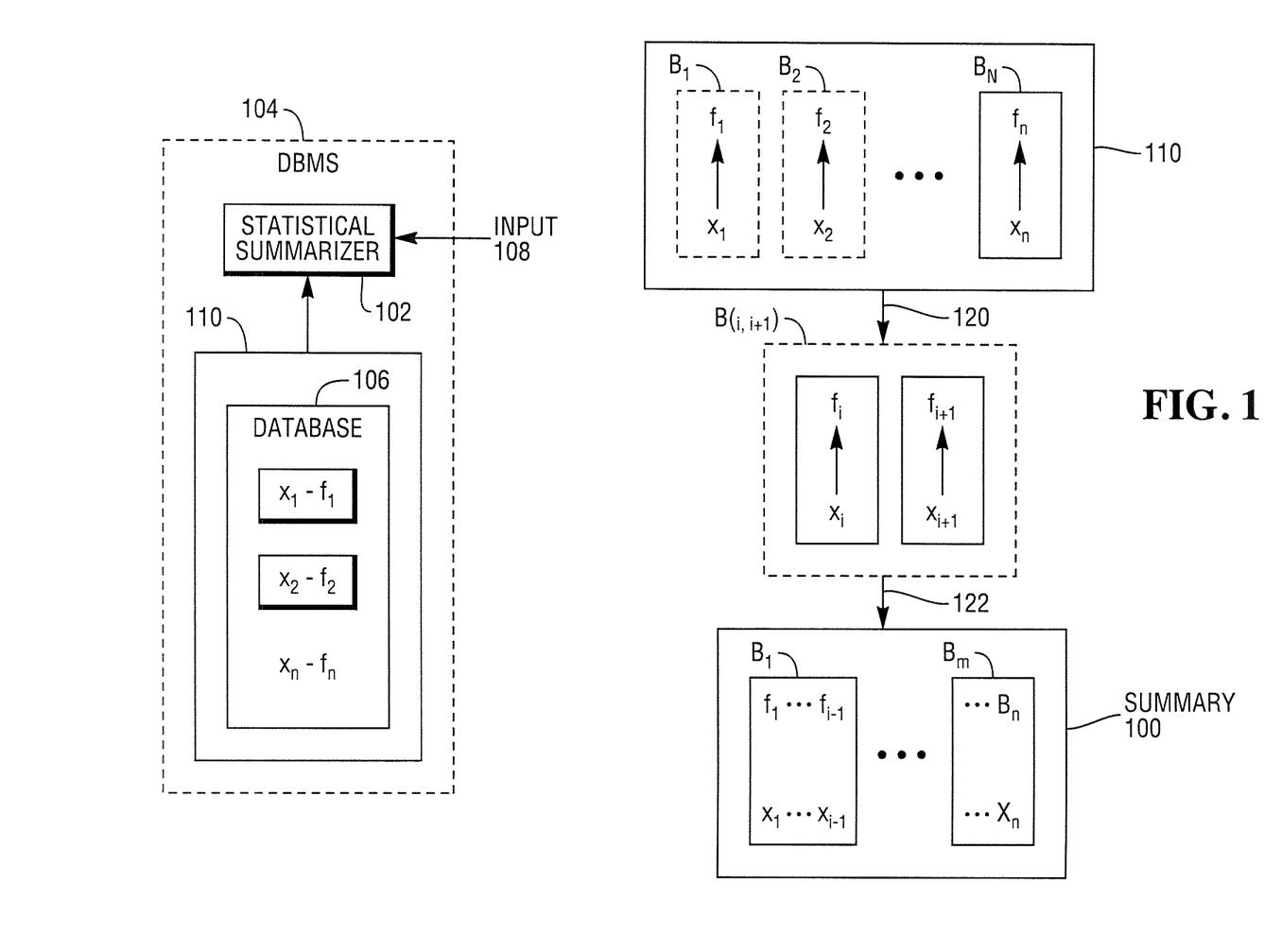
FIG. 1 depicts a statistical summarizer in a computing environment in accordance with one embodiment of the invention.

FIG. 1 depicts a statistical summarizer 102 in a computing environment 104 in accordance with one embodiment of the invention. The statistical summarizer 102 can provide a summary 100 for statistical data in accordance with one or more criteria that can, for example, be provided as input parameters 108 to the statistical summarizer 102. As suggested by FIG. 1, the statistical summarizer 102 can, for example, be provided as a part of a Database Management System (DBMS) 104 for a database 106. As such, the summary 100 can, for example, represent summary of statistics for a database (e.g., a histogram for column values of a table in a database). In the context summary of statistics for a database, the input parameters 108, can, for example, specifying one or more parameters and/or conditions for the summary (e.g., summarize in four different categories, ranges, etc.)

By way of example, a number of values $(X_1-X_N)$ in the database can each be respectively associated with one or more indicators $(F_1-F_N)$ in the database 106. The values $(X_1-X_N)$ can, for example, be column values and indicators $(F_1-F_N)$ can, for example, represent frequencies of occurrences respectively for the column values $(X_1-X_N)$. In this example, an input parameter 108 can, for example, indicate to the statistical summarizer 102 that a summary is to be provided with only three (3) ranges of values for tens or hundreds of column values $(X_1-X_N)$ in the database 106.

Referring to FIG. 1, data 110 of the can be presented as data $110^i$ with a number of "buckets" $B_1-B_N$, where each bucket $B_i$ consists of a value $X_i$ and its associated indicator value(s) $F_i$. In order to provide the summary 100, the statistical summarizer 102 may optionally combine any adjacent buckets that have the same indicator value in accordance with one embodiment of the invention. However, generally, the statistical summarizer 102 combines adjacent buckets together to generate the summary 100. Referring back to FIG. 1, the statistical summarizer 102 can combine two adjacent buckets $B_i$ and $B_{i+1}$ together to form a single bucket $B_{(i,\ i+1)}$ in an intermediate operation or phase 120. It will be appreciated that the statistical summarizer 102 can select adjacent buckets to be combined in a manner that would allow the summary 100 to be provided in accordance with one or more desired conditions.

For example, in order to provide a histogram for frequencies for column values, adjacent buckets can be selected based on the proximity of their associated frequencies. In other words, two adjacent buckets that have the least difference between their indicators can be selected to be combined into one (or a single) bucket. The selection process can be repeated using an average value for the combined bucket. As a result, two other adjacent buckets can be selected to be combined and represented into one bucket. Buckets can be combined until a desired number of buckets have been achieved. Referring to FIG. 1, after one or more intermediate phases 120, a final phase 122 can yield the desired number of buckets, namely M buckets $(B_1-B_M)$.

Figure 2A:
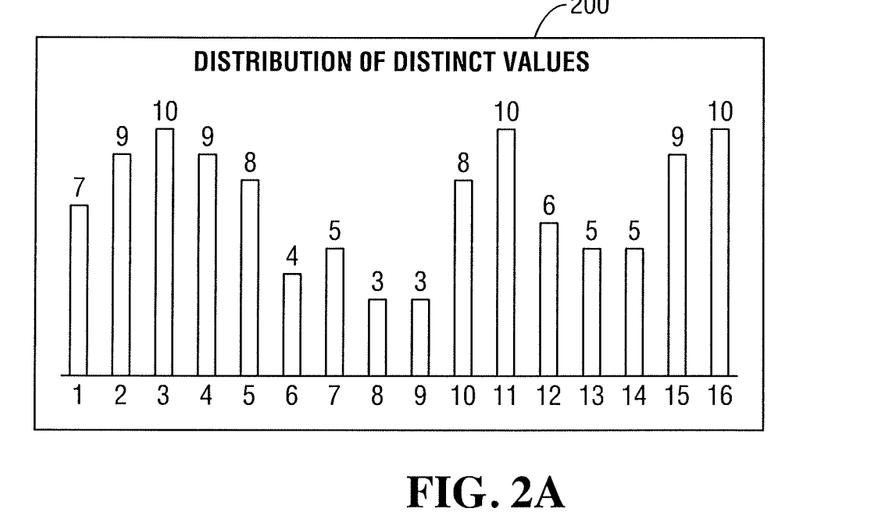
FIGS. 2A, 2B and 2C depict a simplified distribution of distinct values representative of statistical data that can be summarized by statistical summarizer for a database in accordance with one embodiment of the invention.

To further elaborate, FIG. 2A depicts a simplified distribution of distinct values 200 representative of statistical data that can be summarized by statistical summarizer 102 (shown in FIG. 1) for a database in accordance with one embodiment of the invention. In other words, the distribution of distinct values 200 can represent an example of data or statistical data 110 (shown in FIG. 1) that can be summarized by the statistical summarizer 102 (also shown in FIG. 1). In this example, the statistical data 110 is to be ultimately summarized into five (5) buckets in a manner that would minimize the differences (or error) between the values grouped into each of the five (5) buckets.

Referring to FIG. 2A, the distinct values are represented as integers from one (1) to sixteen (16), wherein each integer value is associated with an indicator value represented as a bar. Hence, the first value, namely, one (1), is associated with an indicator value of seven (7) and the second value, namely, two (2), is associated with an indicator value of nine (9) and so on. It should be noted that values are arranged in an ascending order from left to right. It should also be noted that the statistical summarizer 102 (shown in FIG. 1) can be configured to arrange the values as such or be provided the values already arranged in the order depicted in FIG. 2A. Although not shown in FIG. 2A, the values can be considered to be in single buckets, where each value would be in its own bucket (i.e., sixteen (16) buckets where each bucket holds only one value and its indicator).

Figure 2B:
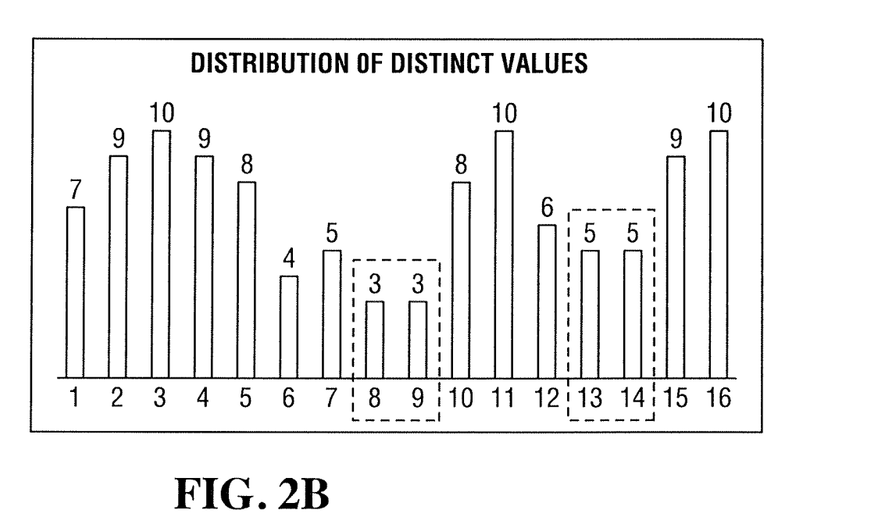

Given the criteria of minimizing error in this example, the statistical summarizer 102 (shown in FIG. 1) can proceed to group adjacent values (or buckets) that have equal indicator values. As a result, values of eight (8) and nine (9) can be group together into a single bucket as represented in FIG. 2B by the lines drawn around them. Referring to FIG. 2B, values of thirteen (13) and fourteen (14) can also be grouped together into a single bucket as represented by lines drawn around them. As a result, the original sixteen (16) buckets can be reduced to fourteen (14) buckets.

Thereafter, the statistical summarizer 102 (shown in FIG. 1) can proceed to select two or more other adjacent buckets to be combined such the difference between their indicators would be minimized in comparisons to the other adjacent buckets that could be combined. In other words, statistical summarizer 102 (shown in FIG. 1) can determine the combination of which two buckets would yield the minimum error as a measure of the difference between their indicators. The statistical summarizer 102 can continue to select two or more other buckets and combine them based on the minimum error criteria as a measure of the difference between their indicators until ultimately the desired number of buckets, namely, five (5) is achieved. The intermediate selections are further explained below, by way of example, for a square error measurement as a criterion for the selection of the adjacent buckets to be combined.

Figure 2C:
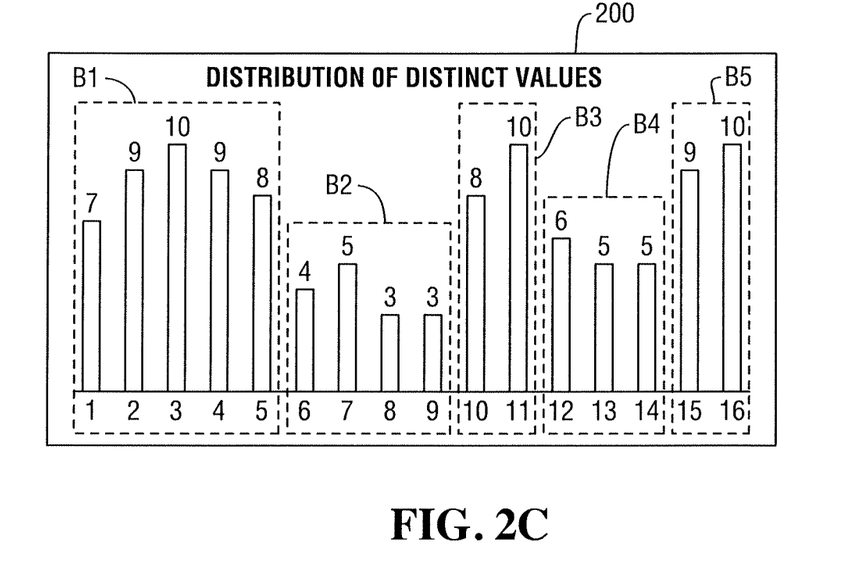

The resulting five (5) buckets are depicted in FIG. 2C as buckets B1, B2, B3, B4 and B5 where they can serve as a summary for the distribution of the distinct values 200. For example, the first bucket can represent a range of values between one (1) and five (5), where the sum or the average of all indicators can be used as statistical data for values in that range, and so on.

Figure 3A:
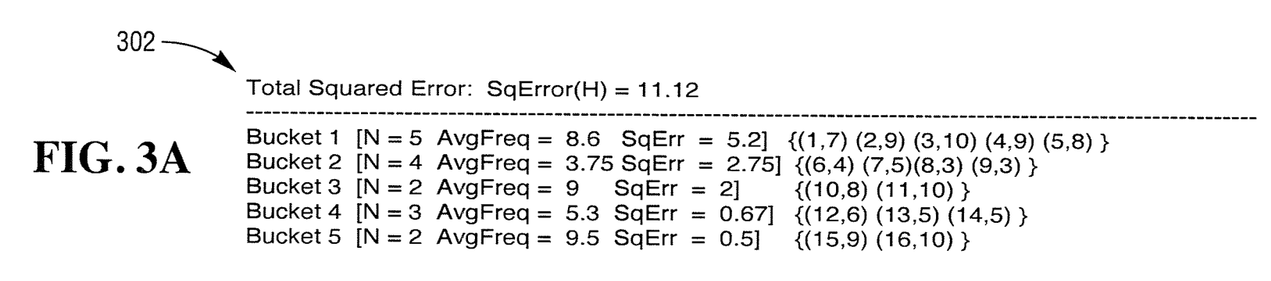
FIG. 3A depicts a resulting summary of statistical data that can be obtained in accordance with one embodiment.

To further elaborate, FIG. 3A also depicts the resulting five (5) buckets (also shown in FIG. 2C) as buckets B1, B2, B3, B4 and B5. In other words, FIG. 3A depicts the resulting summary 302 that can be obtained in accordance with one embodiment of the invention. Referring to FIG. 3A, to provide an example, average of the indicators are shown as an "AvgFreq," reprehensive of frequencies of occurrence of values in a database, and the error values as a Square Error measurement ("SqErr") in accordance with one embodiment of the invention, namely, a Constrained V-optimal Histogram (CVOH). As shown in FIG. 3A, the Constrained V-optimal Histogram (CVOH) technique can yield a total square error value of "11.12."

Figure 3B:
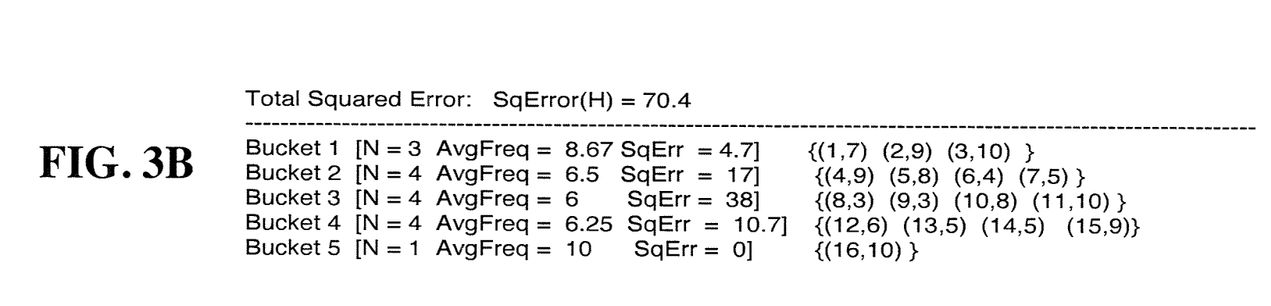
FIGS. 3B and 3C depicts resulting summary of statistical data that can be obtained using conventional techniques.
Figure 3C:
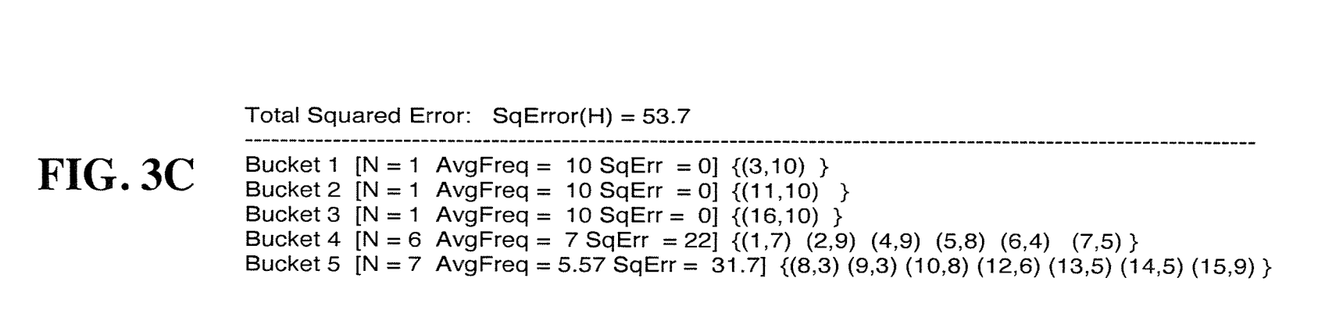

In contrast to FIG. 3A, FIGS. 3B and 3C respectively depict the result that can be achieved by an Equal-depth Histogram and a High Biased Histogram techniques to summarize the same data, namely, a simplified distribution of distinct values 200 (shown in FIG. 2A). Referring to FIGS. 3B and 3C, respectively, total square errors of "70.4" and "53.7" can be achieved by an Equal-depth Histogram and a High Biased Histogram techniques, whereas, a Constrained V-optimal Histogram (CVOH) technique can yield a total square error of "11.12" which is significantly lower and more desirable since in essence more similar values can be grouped together to provide a more accurate and thus a more useful summary of the distribution of distinct value 200 as a simplified example of statistical data of a database.

Figure 4:
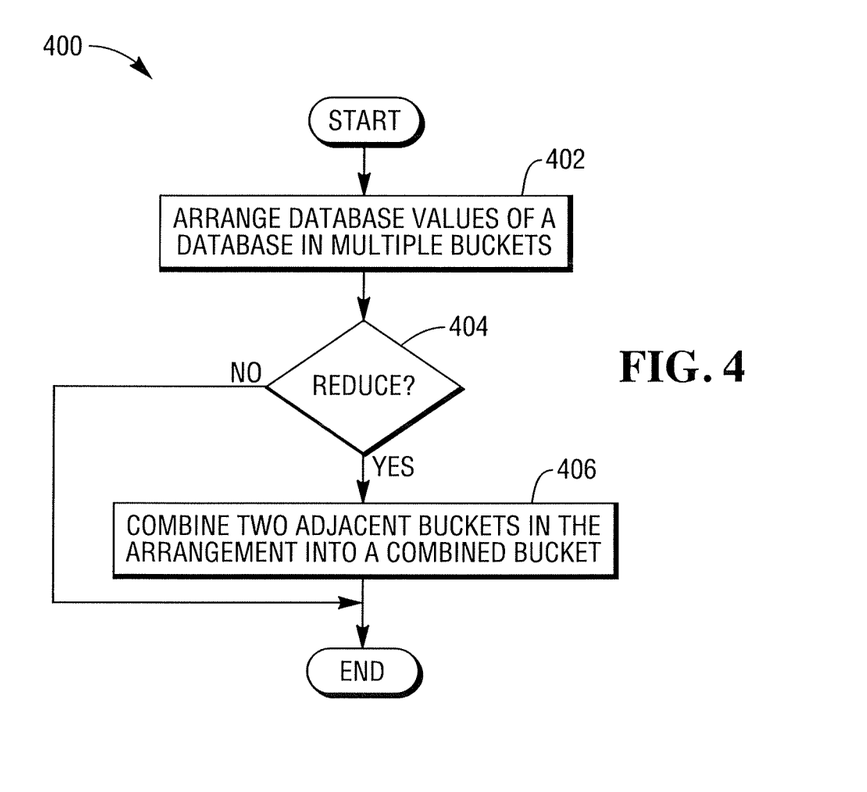
FIG. 4 depicts a method 400 of storing database values and their associated indicator values in a summarized form in accordance with one embodiment of the invention.

To further elaborate, FIG. 4 depicts a method 400 of storing database values and their associated indicator values in a summarized form in accordance with one embodiment of the invention. Method 400 can, for example, be used by the statistical summarizer 102 shown in FIG. 1. Referring to FIG. 4, initially, database values of a database (e.g., column values of a database table) are arranged (402) in multiple buckets in accordance with an order in an arrangement (e.g., in an ascending order). It should be noted that each one of the database values is associated with an indicator value (e.g., frequency of occurrence of the database column value) and each one of the multiple buckets includes only one of the database values with its associated indicator. In other words, initially, each bucket had only one database value and its associated indicator. Next, it is determined (404) whether to reduce the number of buckets. By way of example, it can be determined (404) whether a particular value, namely a desired total number of buckets indicative of total number of buckets has been reached. Accordingly, method 400 can continue to combine (406) two adjacent buckets in the arrangement into a combined bucket based one or more criteria associated with the indicator values until it is determined (404) not to further reduce the number of buckets, for example, until the desired total number of buckets has been reached. The method 400 ends when it is determined (404) not to reduce the number of buckets, for example, as it can be determined (404) that a desired total number of buckets has been reached.

Figure 5:
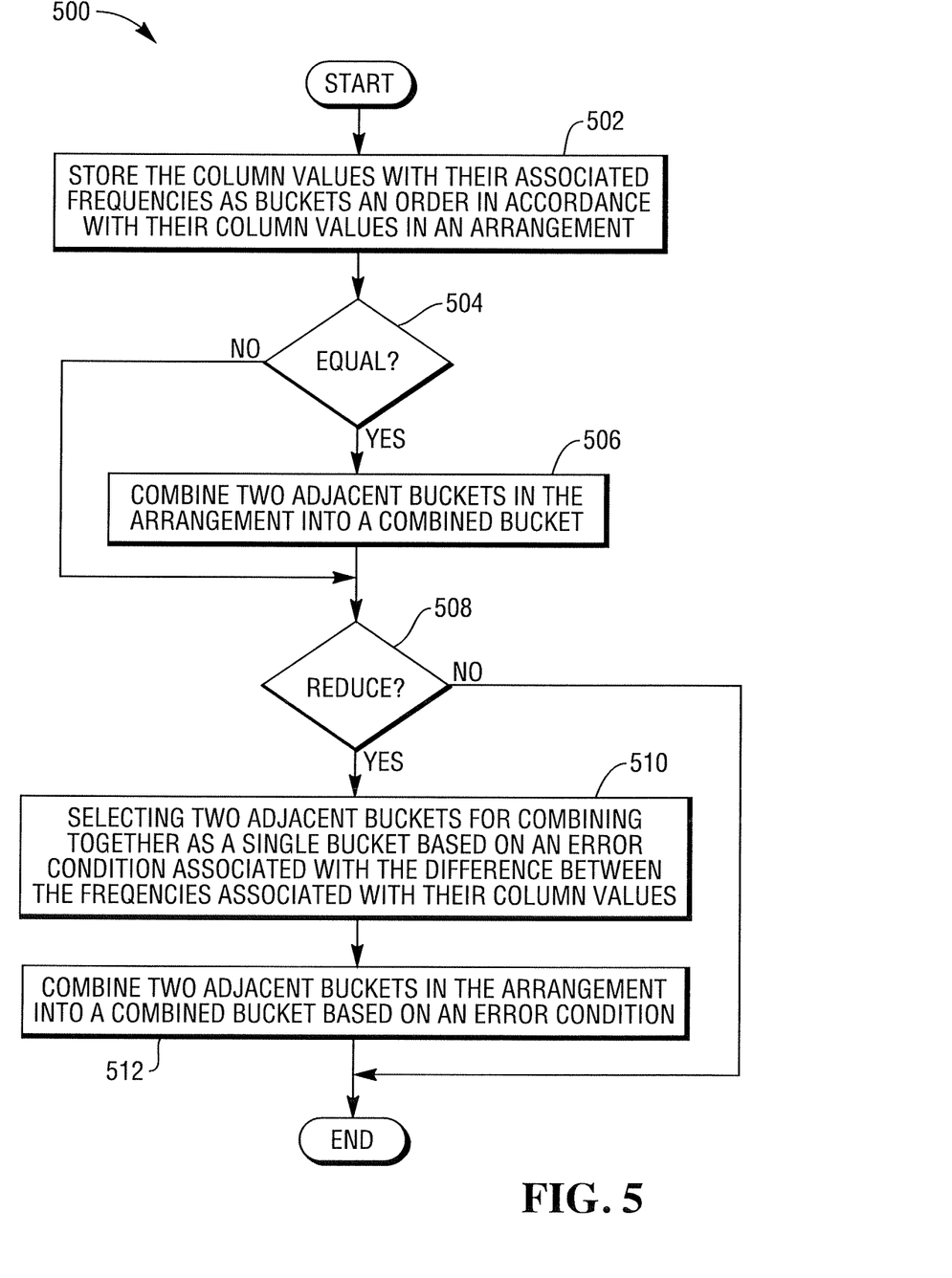
FIG. 5 depicts a method 500 storing frequencies of column values in a summarized form for a table of a database in accordance with one embodiment of the invention.

To elaborate even further, FIG. 5 depicts a method 500 storing frequencies of column values in a summarized form for a table of a database in accordance with one embodiment of the invention. Method 500 can, for example, be used by the statistical summarizer 102 shown in FIG. 1. Referring to FIG. 5, initially, column values with their associated frequencies are stored (502) as buckets in an order in accordance with their column values in an arrangement. Next, it is determined (504) if any adjacent buckets in the arrangement have an equal frequency associated with their column values. Accordingly, one or more adjacent buckets in the arrangement that have an equal frequency associated with their column values can be combined (506) into a single bucket. Thereafter, it is determined (508) whether to reduce the total number of buckets to reach a maximum allowed number of buckets. As a result, two adjacent buckets can be selected (510) for combining together as a single bucket based on an error condition associated with the difference between the frequencies of their column values. The selected buckets can be combined (512) into a single bucket. In effect, the method 500 can continue to select (510) and combine (512) two adjacent buckets based on the error condition associated with the difference between the frequencies of their column values until it is determined (508) not to reduce the total number of buckets as the maximum allowed number of buckets has been reached. The method 500 can end when it is determined (508) that maximum allowed number of buckets has been reached.

As noted above, selections of adjacent buckets to be combined can be further discussed in context of a square error measurement. Generally, The distinct values (e.g., a table column values) can be represented as a finite data sequence X:

$$X = x_1 < x_2 < x_3 < \ldots < x_n, \text{ and}$$

the indicator values (e.g., frequency counts) of these values can be expressed:

$$f_{x1} f_{x2} f_{x3} \ldots f_{xn}.$$

Let M be the maximal number of buckets in a histogram. M can, for example, be determined by a database system considering its resource consumption or/and computation cost, etc. A bucket (e.g. a histogram bucket) can represent a subsequence of X values, $$x_s, x_{s+1}, x_{s+2}, \ldots x_e,$$

where $x_s$ is the start point of the bucket and $x_e$ is the end point of the bucket. Then the range can be represented by a single point $h_r$ of the bucket. Here the $h_r$ can, for example, be the average frequency of all the X values in that range and it is used as an estimate, for example, for the frequency of each value in $x_s, x_{s+1}, x_{s+2}, \ldots x_e$. Hence, an estimated error for a value can be the difference between its actual frequency and $h_r$. For example, the error for $x_{s+1}$ is $|h_r - fx_{s+1}|$. In practice, the squared error $(h_r - fx_{s+1})^2$ is preferred. So the squared error for the values in a bucket $b_r$ is:

$$SqError(b_r) = \sum_{k=s}^{e} (h_r - f_{xk})^2$$

A V-Optimal histogram problem is to find a grouping schema for the M buckets to minimize the total squared error of the whole histogram:

$$\text{Minimize}\left[SqError(H) = \sum_{r=1}^{M} \sum_{k=s_r}^{e_r} (h_r - f_k)^2\right]$$

Generally, the smaller the total squared error is, the better the histogram is. The exhausted search of the global optimal histogram can be a NP-hard problem because any M−1 out of N distinct values can be selected as the boundaries for the M buckets and all of these possible choices need to be examined. It should be noted other criteria can be considered by assigning or reassigning error values to affect the likelihood of combining of values one way or another. For example, based on a workload or given knowledge of existing distribution of a column value, a user can pre-assign a preliminary error value to be added to one or more specific column values in a database. As a result, the column values would be less likely to be combined with other values in an effort to keep them in their own bucket.

It will be appreciated that the techniques described above are especially suitable for large database systems that can typically store relatively large amount of data. Such databases can include large parallel or multiprocessing database systems that may be comprised of multiple database nodes (or nodes), where each node can have its own processor(s) and storage device(s).

Figure 6:
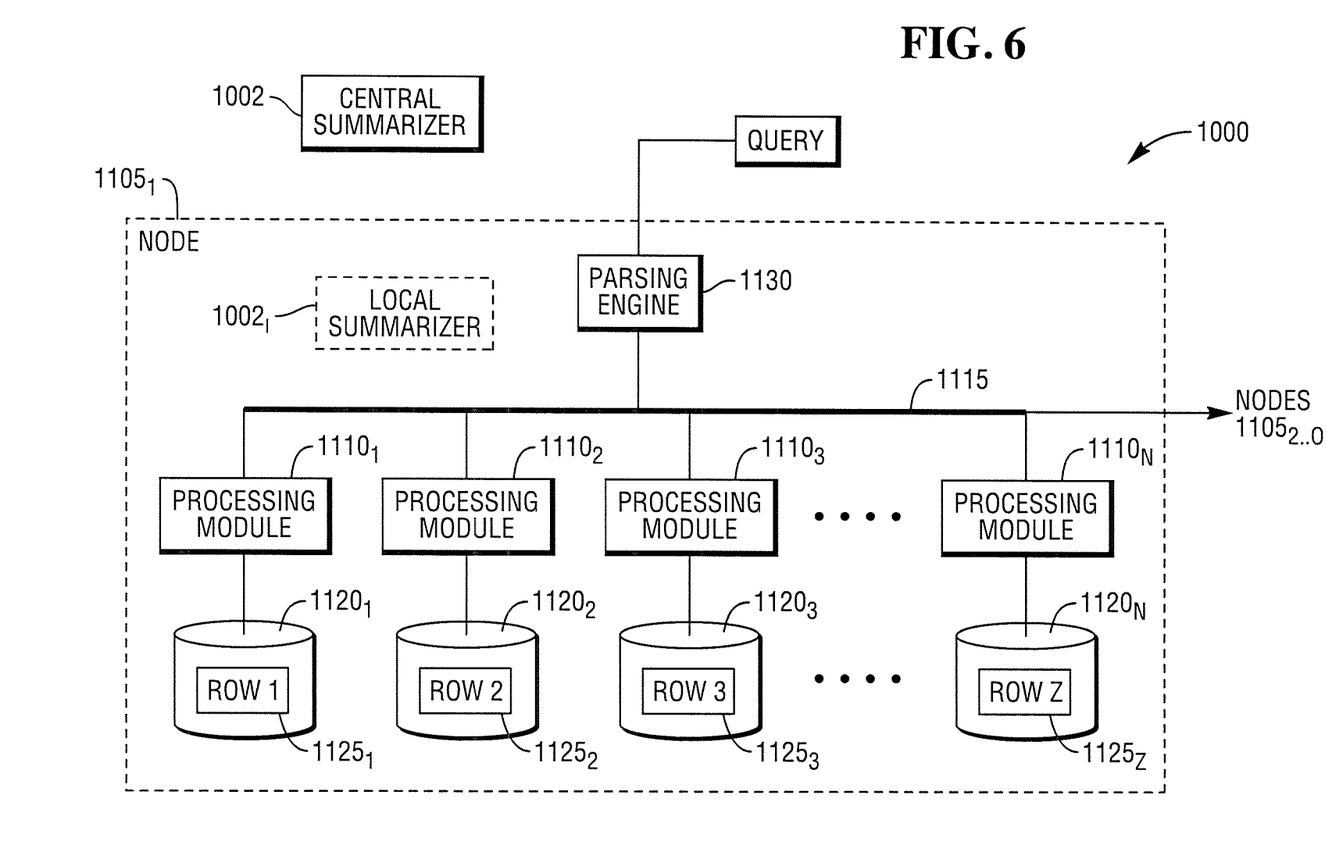
FIG. 6 depicts a database node of a database system or a Database Management System (DBMS) in accordance with one embodiment of the invention.

To further elaborate, FIG. 6 depicts a database node 1105 of a database system or a Database Management System (DBMS) 1000 in accordance with one embodiment of the invention. The DBMS 1000 can, for example, be provided as a Teradata Active Data Warehousing System. It should be noted that FIG. 6 depicts in greater detail an exemplary architecture for one database node $1105_1$ of the DBMS 1000 in accordance with one embodiment of the invention.

Referring to FIG. 6, the DBMS node $1105_1$ includes multiple processing units (or processing modules) $1110_{1-N}$ connected by a network 1115, that manage the storage and retrieval of data in data-storage facilities $1120_{1-N}$. Each of the processing units $1110_{1-N}$ can represent one or more physical processors or virtual processors, with one or more virtual processors (e.g., an Access Module Processor (AMP)) running on one or more physical processors in a Teradata Active Data Warehousing System). For example, when provided as AMPs, each AMP can receive work phases from a parsing engine (PE) 1130 which is also described below.

In the case in which one or more virtual processors are running on a single physical processor, the single physical processor swaps between the set of N virtual processors. For the case in which N virtual processors are running on an M-processor node, the node's operating system can schedule the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing units $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). Again, it should be noted that the DBMS 1000 may include additional database nodes $1105_{2-O}$ in addition to the database node $1105_1$. The additional database nodes $1105_{2-O}$ can be connected by extending the network 1115. Data can be stored in one or more tables in the data-storage facilities $1120_{1-N}$. The rows $1125_{1-z}$ of the tables can, for example, be stored across multiple data-storage facilities $1120_{1-N}$ to ensure that workload is distributed evenly across the processing units $1110_{1-N}$. In addition, a parsing engine 1130 can organize the storage of data and the distribution of table rows $1125_{1-z}$ among the processing units $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as, for example, SQL. Parsing engine 1130 can also handle logons, as well as parsing the SQL requests from users, turning them into a series of work phases that can be sent to be executed by the processing units $1110_{1-N}$.

For example, a client-side Host (e.g., a Personal Computer (PC), a server) can be used to logon to the database system 1000 provided as a Teradata database server. Commination between the client-side Host and the database system 1000 can be facilitated by a database communicating mechanism, for example, by an ANSI CLI (Call Level Interface) standard that can include parcel requests and responses that facilitate the movement of data resident on the client-side host over to the database system 1000.

For example, the rows $1125_{1-z}$ can be distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index may be called the hash function. Some portion, possibly the entirety, of the hash value can be designated a "hash bucket". As such, the hash buckets can be assigned to data-storage facilities $1120_{1-N}$ and associated processing units $1110_{1-N}$ by a hash bucket map. The characteristics of the columns chosen for the primary index determine how evenly the rows are distributed.

Referring again to FIG. 6, it should be noted that a statistical summarizer 1002 can be provided as a central component for the processing units $1110_{1-N}$. However, it should be noted that each one of the processing units $1110_{1-N}$ can be effectively provided with a local statistical summarizer that can serve as a local component and possibly collaborate with the central data management system 1002. Of course, various other configurations are possible and will become readily apparent in view of the foregoing.

In accordance with one embodiment, V-Optimal Histogram can be provided. It will be appreciated that the V-Optimal Histogram can, for example, be provided for relatively large tables (e.g., one terabyte tables) with a relatively large number of distinct values in a parallel processing environment, such as the database system 1000 (depicted in FIG. 6). For example, the process for providing the V-Optimal Histogram can be done in two parts. In the first part, each AMP scans its local table rows to collect distinct values and their frequencies. The parallel scanning of the table rows on multiple AMPs can be done in a conventional manner. Then, in the second part, all the distinct values and their frequencies will be sent to a master AMP for global aggregation. Thereafter, the master AMP will build the histogram from the distinct values. The technique for doing can, for example, be performed as follows:

Input: the maximal bucket number M, and the table and column that the histogram is built for.
Output: The Constrained V-Optimal Histogram
Technique for V-Optimal Histogram:
Phase 1: Each AMP collects the distinct values and their corresponding frequencies locally.
Phase 2: The local information is sent from every AMP to a selected master AMP for global aggregation. And the distinct values from all AMPs (associated with their corresponding frequencies) are sorted in a list on the increasing order of values. Assume there are totally N distinct values.
Phase 3: The master AMP builds the initial histogram buckets where each bucket contains only one or more immediate neighbor values with the same frequency. Then we continue on phase 4 and 5 to merge neighbor buckets further until the total number of buckets in the final result is equal to or less than M.
Scan the sorted list starting from the first value $X_1$. At $X_1$, the first bucket $b_1$ is built with: $b_1$ start_point=$b_1$ end_point=$X_1$, $b_1$ number_of_values=1, $b_1$ average_frequency=$fx_1$, and $b_1$ sqared_error=0.
Then, look ahead the right neighbor of $X_1$, one by one. As long as the frequency of the neighbor is the same as $fx_1$, continue to look ahead until encounter: a $X_{i+1}$ with $fx_{i+1}$ not equal to $fx_1$. When it stops at $X_{i+1}$, pack all the values from $X_1$ to $X_i$ into $b_1$. Now update $b_1$ to: $b_i$ end_point=$X_i$, and $b_1$ number_of_values=i.

It is noticed that $b_1$.average_frequency and $b_1$.sqared_error are kept unchanged. Then, start to look at the value $X_{i+1}$ and build the second bucket $b_2$ with:
$b_2$.start_point=$b_2$.end_point=$X_{i+1}$
$b_2$.number_of_values=1, and $b_2$.sqared_error=0.

Then, do the same as it were at $X_1$. All the values following $X_{i+1}$ that have the same frequency $fx_{i+1}$ will be packed into $b_2$. Suppose we stop at $X_{j+1}$, then update $b_2$ with: $b_2$.end_point=$X_j$, and $b_2$.number_of values=j−i.

Similarly, $b_2$.average_frequency and $b_2$.sqared_error are kept unchanged. Then, continue to do this until scanning of all values is finished. Suppose, we have built M' buckets and these buckets have actually been placed in a list, Result_List, of the increasing order on their start_point. If M'<=M, then the work is done and the resulting histogram consists of the M' buckets. But if M'>M, then we continue to phase 4 below.

Phase 4: The master AMP probes the merge of each pair of neighbor buckets in the current Result_List. Rank the possible merges of these pairs so that we can start to merge the best candidates, the second best, the third best, and so on, in the next phase (phase 5). In the rank, the workload-related constraints can be considered. The workload-related constraints can, for example, be specified by a customer of the database, so that the order of the merge can be controlled. As a result, this may give higher resolution to the buckets that contain, for example, "hot" values:

Scan the M' buckets from the beginning of the Result_List. For any two immediate neighbor buckets $b_i$ and $b_{i+1}$, a new bucket $b_{(i, i+1)}$ is built to combine the two by including all their values. The average frequency and squared error of $b_{(i, i+1)}$ will be calculated from all the values. At the same time, we will record the $b_{(i, i+1)}$.delta_error with:

$$b_{(i,i+1)}.\text{delta\_error}=b_{(i,i+1)}.\text{squared\_error}-(b_i.\text{squared\_error}+b_{i+1}.\text{squared\_error})$$

Each bucket $b_{(i, i+1)}$ is also assigned a ranking score. As the simplest case, the ranking score can be defined as delta_error. Basically, if the merge of two buckets can produce a bigger bucket with minimum increment in squared error, then this merge is preferred first. As will be discussed below, this ranking score definition can be enhanced to integrate the user-specified constraints. The phase 4 ends up with a new list, Working_List, of M'−1 new buckets which are sorted in the increasing order of their ranking scores.

Phase 5: The master AMP starts to merge the buckets in the Result_List as instructed by the bucket at the beginning of the Working_List, because the first bucket in Working_List is considered as the best candidate for a merge at that moment. Once the merge is done, then update the Result_List and Working_List to reflect the impact of the merge. Then, continue to process the next top bucket in the Working_List. This will be repeated until the total number of buckets in Result_List is reduced to M.

Looking at the Working_List, since its buckets are sorted on the increasing order of their ranking scores, the bucket at the beginning of Working_List actually points to the best two candidate buckets in the Result_List for a merge. The second bucket in the Working_List points to the second best candidate bucket pair in the Result_List for a merge, and so on. Thus, we will start the merge process with the first bucket in the Working_List.

5.1 Suppose the bucket b(i, i+1) is the first bucket in Working_List currently, take it off from the Working_List. It indicates us that the two best candidate buckets will be bi and bi+1 in the Result_List for a merge. After we take off b(i, i+1), the second bucket in the Working_List will pop to the top. Update the Result_List by replacing the two candidate buckets $b_i$ and $b_{i+1}$ with the new bigger bucket $b_{(i, i+1)}$.

5.2 It is noticed that in Phase 4 when we build the Working_List, the bucket $b_i$ in the Result_List might be used twice to build new buckets $b_{(i-1, i)}$ and $b_{(i, i+1)}$. Similarly, $b_{i+1}$ might be used twice to build new buckets $b_{(i, i+1)}$ and $b_{(i+1, i+2)}$. We also need to take off $b_{(i-1, i)}$ and $b_{(i+1, i+2)}$ from the Working_List too because our merge has affected the information of the two. Now we look at the buckets $b_{i-1}$, $b_{(i, i+1)}$, and $b_{i+2}$ in the Result_List. The buckets $b_{i-1}$ and $b_{(i, i+1)}$ will be combined to build a new bucket to replace the old $b_{(i-1, i)}$. And the buckets $b_{(i, i+1)}$ and $b_{i+2}$ will be combined to build another new bucket to replace the old $b_{(i+1, i+2)}$. For each of the two new buckets, we need to re-insert it into the sorted Working_List. When we insert the two new buckets into Working_List, we also assign appropriate ranking scores to each of them. The ranking scores will account for the customer's workload-related constraints to control where to insert them. It is noticed that the position of a bucket in the Working_List will determine when it is considered as a good candidate for a merge.

5.3 Repeat sub-phase 5.1 to 5.3 until the total number of buckets in the Result_List reaches M.

Phase 6: The master AMP returns the Result_List as the Constrained V-Optimal Histogram and save it in the database dictionary.

The initial sorting of the Result_List (phase 2) and Working_List (phase 4) will be O(N log N). Then at most (M'−M<N) merges will happen in phase 5. Each merge may require updating Working_List and Result_List. With the help of advanced structures like B-tree or maxheap, each of these updates is expected to be done at an average computation cost of O(log N). Thus, the total computation complexity of CVOH will be O(N log N).

Collect Statistics

CVOH with Workload-Related Constraints

In some cases the database environments and its data may be well known. For example, in many cases in real life, users (especially administrators) of databases may know the workload of their applications very well. Today, there are also utilities available to help database users determine the characteristics of a specific workload. As one example, a database user can attempt to collect statistics on a column col_1 of table tab_1. In this case, the user may know that the tab_1 is often joined to a very big table tab_2 in an application, and the join condition is "tab_1.col_1=tab_2.col_2." The database user may also know that most rows in tab_2 have column col_2 values in the range between 10 and 20. This means any significant estimation error for col_1 values in the range between 10 and 20 could seriously hinder the determination of a cardinality estimation of the join. In this case, the database user can build a CVOH on tab_1.col_1 so that higher resolution is especially given to the values between 10 and 20 in the histogram in accordance with one embodiment. This can help the optimizer to improve its estimation accuracy. In other words, the database user is able to use the knowledge about the database to build a histogram which is optimized for a particular database query or database workload. In one embodiment, the database user can, for example, submit an enhanced "COLLECT STATISTICS" statement like the below:

COLLECT STATISTICS ON tab_1 COLUMN col_1
HISTOGRAM CVOH
CONSTRAINTS (MAX ESTIMATE ERROR PERCENTAGE 20% WHEN col_1 BETWEEN 10 AND 20)

This statement can instruct a database system that when CVOH for col_1 is constructed, if a bucket has already contained values in the range between 10 and 20, then the merge between it and any other buckets needs to be evaluated against the constraints. If the evaluation result conflicts with the constraints, the ranking score assigned to the bucket representing that merge will be adjusted, for example, from a default "delta_error" value to a very high value. As a result, all such buckets can be placed somewhere close to the end of a Working_List by the sorting and insertion operations. Then, the construction algorithm can try to explore other merge possibility first. Only when there is no other choice and the number of buckets is still bigger than M, the merge of this bucket with others can be considered.

It should be noted that if the constraints correspond to a group of individual values to be held off from the merge, then the CVOH will be similar to HBH; they both use a group of buckets to save the individual high-biased values and their frequency. The minor difference is that CVOH uses V-Optimal Histogram for the non-high-biased values but HBH uses Equal-depth. Thus, HBH can be considered as a special case of CVOH.

Integrate Workload-Related Constraints into CVOH
Referring to phase 4:
When we build any bucket $b_{(i, i+1)}$ for the Working_List, consider the constraint. For every value $x_j$ contained in the bucket $b_{(i, i+1)}$, if $x_j$ is in the range between 10 and 20, then find its frequency $fx_j$ and check if the condition below is true:

$$|fx_j - b_{(i,i+1)}\cdot\text{average\_frequency}|/fx_j > 20\%$$

If yes, the constraint will be violated by the merge represented by the bucket $b_{(i, i+1)}$. Thus, the ranking score of bucket $b_{(i, i+1)}$ will be adjusted to very high like:

(delta_error+HIGH_RANK_SCORE_THRESHOLD)

where HIGH_RANK_SCORE_THRESHOLD can a very large constant. The sorting logic of the Working_List will intentionally place it somewhere close to the end of the Working_List. As a result, it will be merged last. In other words, an additional error value can be added to the error value associated with the one or more database values that are not desired to be combined with any or at least one or more other database values, thereby reducing the likelihood of combining that the one or more other database values with the one or more database values. The one or more database values can, for example, be hot values. As another example, a workload constraint can be integrated with a combining strategy for combining buckets, where a preliminary constant error value can be added to the delta-error to avoid combining the one or more other database values.

Referring to Phase 5:
Similarly, whenever we build the two new buckets accordingly for a completed merge and insert them back to the Working_List, we also need to check every value contained in these new buckets against the constraints. If the constraint is violated, the new bucket will be assigned with a ranking score equal to (delta_error+HIGH_RANK_CORE_THRESHOLD) too, and thus be placed to end of the Working_List.

In view of the foregoing, it will be appreciated that a parallel DBMS can efficiently build a V-Optimal Histogram in O (N log N) in accordance with one embodiment. V-Optimal Histogram can be better than other state-of-art histograms in terms of accuracy. This can improve the accuracy of cardinality or selectivity estimation during the optimization phase. As a result, the overall query performance can be enhanced. In addition, users of databases can build a V-Optimal Histogram for their data according to the specific characteristics of data access patterns (e.g., a specific workload). As a result, the histogram generated by CVOH can further improve cardinality or selectivity estimation.

Figure 7:
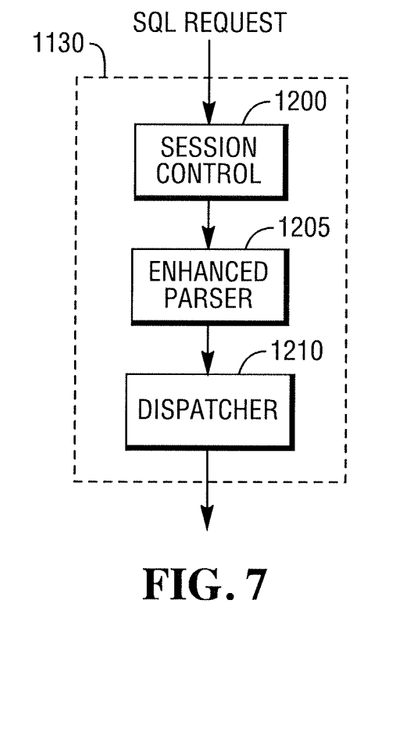
FIGS. 7 and 8 depict a parsing engine in accordance with one embodiment of the invention.

Referring now to FIG. 7, in one exemplary system, the parsing engine 1130 can be made up of three components: a session control 1200, a parser 1205, and a dispatcher 1210. In the example, the session control 1200 provides the logon and logoff function. It accepts a request for authorization to access the database, verifies it, and then either allows or disallows the access. When the session control 1200 allows a session to begin, a user may submit a SQL request, which is routed to the parser 1205. Regarding the dispatcher 1210, it should be noted that some monitoring functionality for data management and/or workload management may be performed by a regulator to monitor workloads and usage of the resources, for example, by using internal messages sent from the AMPs to the dispatcher 1210. The dispatcher 1210 can provide an internal status of every session and request running on the system, for example, by using internal messages sent from the AMPs to the dispatcher 1210. In the example, the dispatcher 1210 can provide an internal status of every session and request running on the system. As such, at least part of a database management can be provided by the dispatcher 1210 in accordance with one embodiment of the invention. The dispatcher 1210 can also operate as a workload dispatcher in order to effectively manage workloads. As such, at least part of data management system can be provided by the dispatcher 1210 in accordance with one embodiment of the invention.

Figure 8:
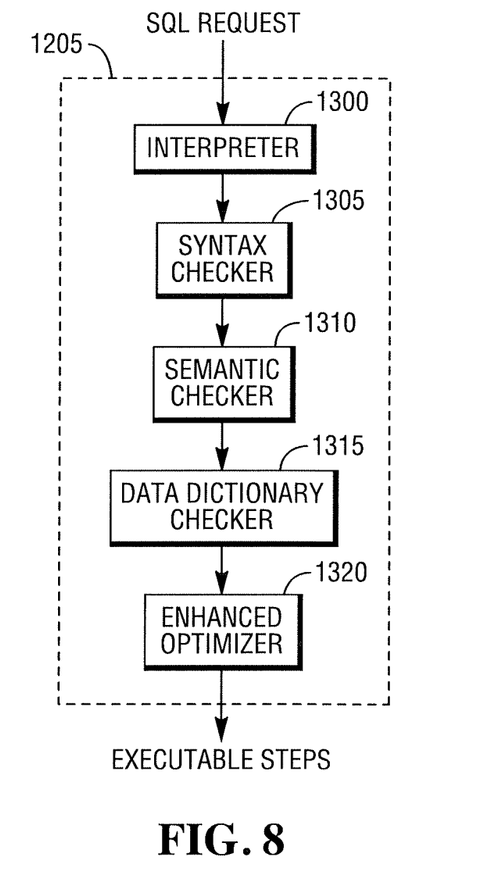

As illustrated in FIG. 8, the parser 1205 interprets the SQL request 1300, checks it for proper SQL syntax 1305, evaluates it semantically 1310, and consults a data dictionary to ensure that all of the objects specified in the SQL request actually exist and that the user has the authority to perform the request 1305. Finally, the parser 1205 runs an optimizer 1320, which can generate the least expensive plan to perform the request.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of storing database values and their associated indicator values in a summarized form, wherein the method is implemented at least partly by a device that includes one or more processors, and wherein the computer-implemented method comprises:

arranging, by the one or more processors, database values of a database in multiple buckets in accordance with an order in an arrangement in an ascending order, wherein each one of the database values in each one of the multiple buckets is associated with an indicator value, and wherein each one of the multiple buckets includes only one of the database values with its associated indicator value;

obtaining a desired total number of buckets;

determining, by the one or more processors, whether to reduce the number of buckets, by at least determining whether the desired total number of buckets has been reached;

combining, by, the one or more processors, two adjacent buckets in the arrangement into a combined bucket based on a criterion associated with the indicator values when the determining determines to reduce the number of buckets, wherein the criterion includes an error criterion determined based on a difference between two or more of the indicator values.

In response to determining hot database values that are not desired to be combined with one or more other database values of the database values, integrating at least one workload constraint into a combining strategy for combining the buckets, and adding a preliminary constant error value to a default delta-error associated with the one or more database values to avoid combining the one or more database values with one more other database values of the database values; and repeating, by the one or more processors, the combining for yet another two adjacent buckets until the determining determines not to further reduce the number of buckets when it is determined that the desired total number of buckets has been reached, thereby reducing the number of buckets in accordance with the desired total number of buckets.

2. The method of claim 1, wherein the desired total number of buckets is provided as input.

3. The method of claim 2, wherein the computer-implemented method further comprises:

adding an additional error value to a default error value associated with the one or more database values that are not desired to be combined with the one or more other database values of the database values, thereby reducing the likelihood of combining that the one or more database values with the one or more other database values.

4. The method of claim 3, wherein the computer-implemented method further comprises:

determining the desired total number of buckets by at least considering one or more of the following: cost of memory, storage, computational resources for maintaining a histogram, and input provided by a database administrator and/or database user.

5. The method of claim 4, wherein the computer-implemented method further comprises: receiving as input through a user interface the desired total number of buckets and the one or more criteria.

6. An apparatus that includes one or more processors operable to store database values and their associated indicator values of a database in a summarized form, by performing at least the following:

arranging database values of a database in multiple buckets in accordance with an order in an arrangement in an ascending order, wherein each one of the database values in each one of the multiple buckets is associated with an indicator value, and wherein each one of the multiple buckets includes only one of the database values with its associated indicator value;

obtaining a desired total number of buckets;

determining whether to reduce the number of buckets, by at least determining whether the desired total number of buckets has been reached;

combining, by the one or more processors, two adjacent buckets in the arrangement into a combined bucket based on a criterion associated with the indicator values when the determining determines to reduce the number of buckets, wherein the criterion includes an error criterion determined based on a difference between two or more of the indicator values;

In response to determining hot database values that are not desired to be combined with one or more other database values of the database values, integrating at least one workload constraint into a combining strategy for combining the buckets, and adding a preliminary constant error value to a default delta-error associated with the one or more database values to avoid combining the one or more database values with one more other database values of the database values; and repeating, by the one or more processors, the combining for yet another two adjacent buckets until the determining determines not to further reduce the number of buckets when it is determined that the desired total number of buckets has been reached, thereby reducing the number of buckets in accordance with the desired total number of buckets.

7. The apparatus of claim 6, wherein the one or more criteria include an error criterion determined based on the difference between two or more of the indicator values.

8. The apparatus of claim 6, wherein the desired total number of buckets is provided as input.

9. The apparatus of claim 6, wherein the one or more criteria includes the desirability for not combining one or more of the database values with one or more other database values of the database values.

10. A non-transitory computer readable storage medium storing at least computer code that when executed at least stores database values and their associated indicator values in a summarized form by at least:

arranging database values of a database in multiple buckets in accordance with an order in an arrangement in an ascending order, wherein each one of the database values in each one of the multiple buckets is associated with an indicator value, and wherein each one of the multiple buckets includes only one of the database values with its associated indicator value;

obtaining a desired total number of buckets;

determining whether to reduce the number of buckets, by at least determining whether the desired total number of buckets has been reached;

combining, by the one or more processors, two adjacent buckets in the arrangement into a combined bucket based on a criterion associated with the indicator values when the determining determines to reduce the number of buckets, wherein the criterion includes an error criterion determined based on a difference between two or more of the indicator values;

In response to determining hot database values that are not desired to be combined with one or more other database values of the database values, integrating at least one workload constraint into a combining strategy for combining the buckets, and adding a preliminary constant error value to a default delta-error associated with the one or more database values to avoid combining the one or more database values with one more other database values of the database values; and repeating, by the one or more processors, the combining for yet another two adjacent buckets until the determining determines not to further reduce the number of buckets when it is determined that the desired total number of buckets has been reached, thereby reducing the number of buckets in accordance with the desired total number of buckets.

11. The non-transitory computer readable storage medium of claim 10, wherein the one or more criteria include an error criterion determined based on the difference between two or more of the indicator values.

12. The non-transitory computer readable storage medium of claim 10, wherein the desired total number of buckets is provided as input.

13. The non-transitory computer readable storage medium of claim 10, wherein the one or more criteria includes the desirability for not combining one or more of the database values with one or more other database values of the database values.

14. The non-transitory computer readable storage medium of claim 10, wherein the computer code that when executed further performs at least the following:
   determining the desired total number of buckets by at least considering one or more of the following: cost of memory, storage, computational resources for maintaining a histogram, and input provided by a database administrator and/or database user.

15. The non-transitory computer readable storage medium of claim 10, wherein the computer code that when executed further performs at least the following:
   receiving as input through a user interface the desired total number of buckets and the one or more criteria.

16. The apparatus of claim 6, wherein the one or more processors are further operable to perform at least the following:
   determine the desired total number of buckets by at least considering one or more of the following: cost of memory, storage, computational resources for maintaining a histogram, and input provided by a database administrator and/or database user.

17. The apparatus of claim 6, wherein the one or more processors are further operable to perform at least the following:
   receiving as input through a user interface the desired total number of buckets and the one or more criteria.

* * * * *